(12) United States Patent
Hsu et al.

(10) Patent No.: US 6,988,517 B1
(45) Date of Patent: Jan. 24, 2006

(54) LINEAR GUIDEWAY WITH QUICK RELEASE OIL TANK

(75) Inventors: Hsin-Tsun Hsu, Taichung (TW); Min-Yao Hsieh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 11/150,963

(22) Filed: Jun. 13, 2005

(51) Int. Cl.
*B65B 1/04* (2006.01)

(52) U.S. Cl. .......................... 141/67; 141/232
(58) Field of Classification Search ............ 141/67, 141/231, 232
See application file for complete search history.

(56) References Cited

U.S. PATENT DOCUMENTS 4,224,968 A * 9/1980 Bosser et al. .............. 141/284
4,678,015 A * 7/1987 Raque et al. ............... 141/131
4,819,702 A * 4/1989 Gerlach ...................... 141/232

* cited by examiner

Primary Examiner—Steven O. Douglas
(74) Attorney, Agent, or Firm—Charles E. Baxley (57) ABSTRACT

A linear guideway with quick release oil tanks comprises: a rail, a slide block disposed on the rail, connectors and an oil tank disposed at an ends of the slide block. The oil tanks is "II"-shaped and includes a base portion and two extension portions, a distance between the two extension portions is larger than a maximum width of the rail, and a maximum width of the base portion of the oil tanks is shorter than a distance between an upper surface of the rail and a top surface of the slide block. The connectors each have a connecting portion and an engaging portion, and is axially defined with a through hole, and the oil tanks are defined with an oil outlet for engaging with the engaging portion of the connectors.

7 Claims, 9 Drawing Sheets

LINEAR GUIDEWAY WITH QUICK RELEASE OIL TANK

BACKGROUND OF THE INVENTION

1. Field of the Invention

The present invention relates to a linear guideway, and more particularly to linear guideway provided with quick release oil tanks.

2. Description of the Prior Arts

A conventional linear guideway generally comprises: rail, steel balls, retainer, slide block, end cap and oil tank (and a plurality of oil scrapers). At either end of the slide block is usually provided with an assembly of end cap and oil tank, and the assembly itself is movably disposed on the rail. However, this conventional linear guideway still has some disadvantages that could be improved:

First, due to the oil tank needs to be refilled with oil regularly, the user has to bend over to refill the oil tank, with hands reaching into the space between the top surface of the rail and the top surface of the slide block. Therefore, it is not ergonomic and the oil-refilling work is time-consuming and laborsome.

Second, since the oil tank needs to be replaced and maintained regularly, and the lower edge of the oil tank engages with the rail because it is disposed on the rail, the oil tank can be removed only after disassembly of the linear guideway. As a result, not only the operation of the linear guideway should stop, but also the oil-tank displacement is time-consuming, resulting in increase in the cost of the linear guideway.

Third, concept of disposable components has become a mainstream, however, the oil tank cannot be made by using this concept due to the lower edge of the oil tank needs to be engaged with the rail.

The present invention has arisen to mitigate and/or obviate the afore-described disadvantages.

SUMMARY OF THE INVENTION

The primary objective of the present invention is to provide a linear guideway with quick-release oil tanks. Each of the oil tanks is "Π"-shaped in cross section and includes two extension portions, the inner edge of the respective oil tanks does not contact the rail, while the oil tanks can be easily assembled to or disassembled from the rail through a distance between the upper surface of the rail and the top surface of the slide block. And a wireless design allows the oil tank to be replaced more easily and quickly, substantially reducing the maintenance and assembly fee for the oil tanks.

The secondary objective of the present invention is to provide a linear guideway with quick-release oil tanks, wherein the distance between the upper surface of the rail and the top surface of the slide block provides a space for quick releasing of the oil tanks, and the wireless design allows the oil tank to be replaced more easily. Therefore, the device of the present invention is ergonomic and can be made by using the concept of disposable product.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Referring to FIGS. 1–7, a linear guideway with quick release oil tank in accordance with the present invention is shown and comprises; a rail 10, a slide block 20, two connectors 30 and two oil tanks 40.

Figure 1:
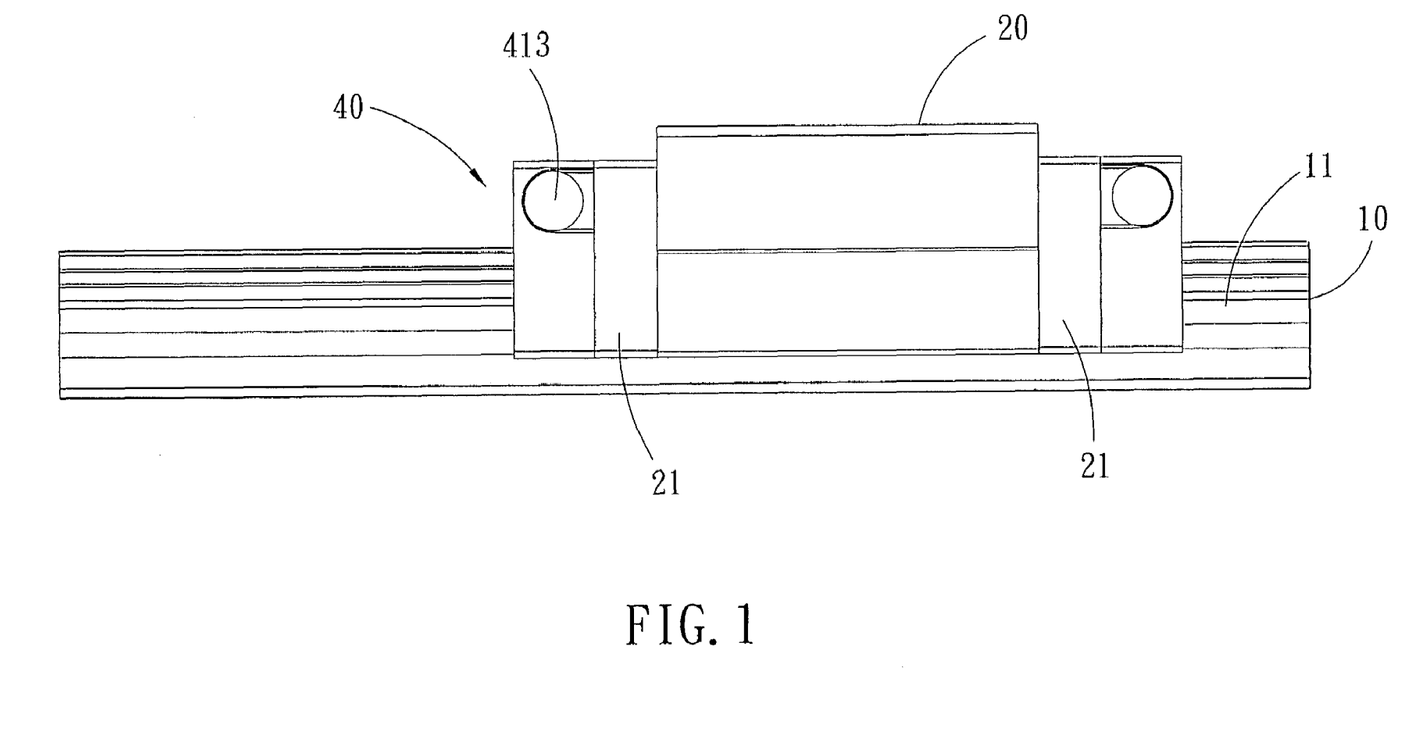
FIG. 1 is an assembly view of a linear guideway with quick release oil tank in accordance with the present invention.
Figure 2:
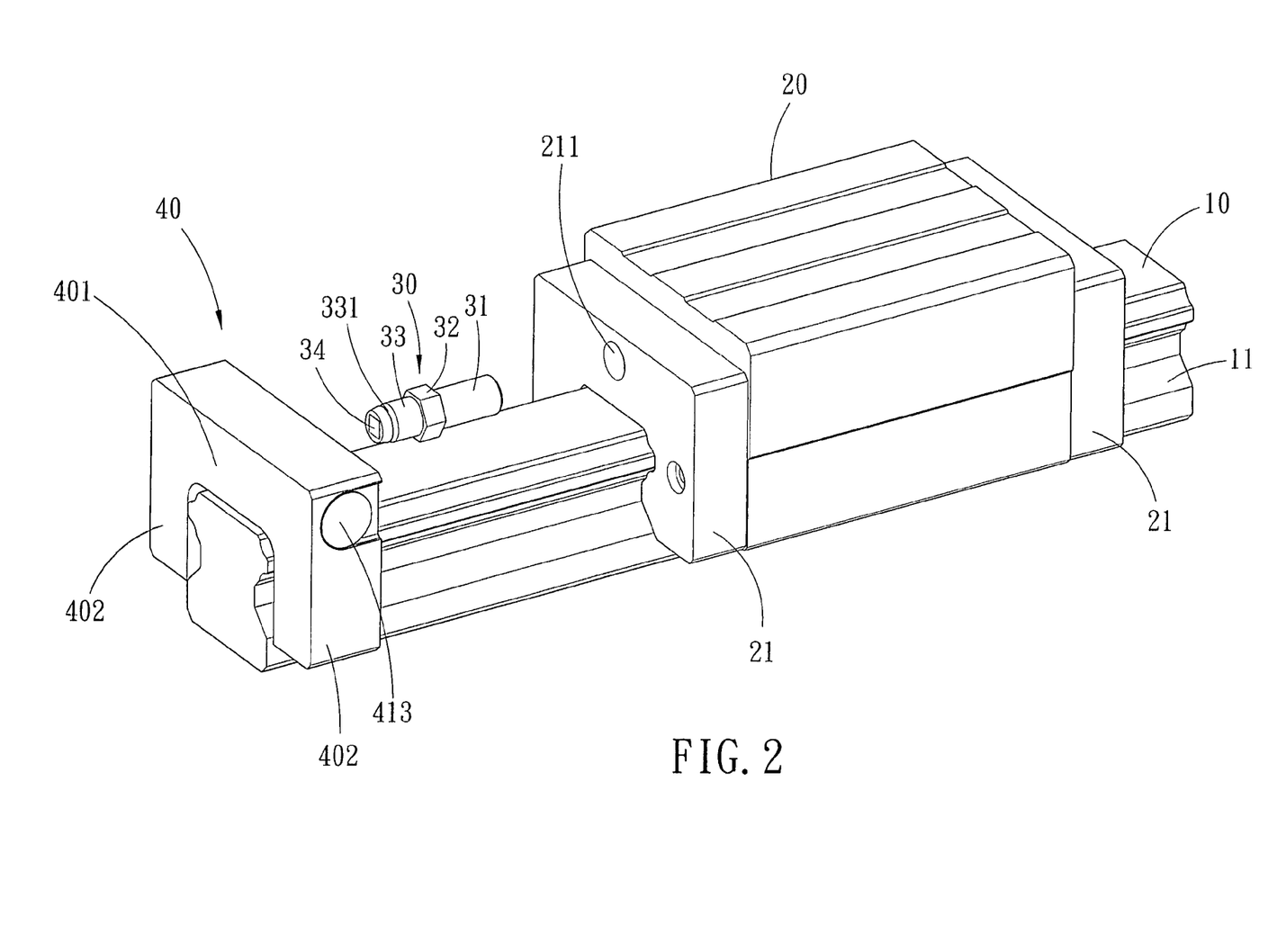
FIG. 2 is an exploded view of the linear guideway with quick release oil tank in accordance with the present invention.

The rail 10, at either side of which is defined a track 11.

The slide block 20 is provided at both ends thereof with an end cap 21, and then the slide block 20 and the end caps 21 are engaged in the tracks 11 of the rail 10. On each end cap 21 is formed a connecting hole 211 having inner threads, and the connecting hole 211 is in communication with the oil circuit inside the slide block 20 and the end caps 21.

The connectors 30 each is provided at an end thereof with a connecting portion 31 having inner threads to be screwed with the connecting hole 211 of the end cap 21. At another end of the connector 30 opposite the connecting portion 31 is defined an engaging portion 33 that is provided with an engaging groove 331. Between the connecting portion 31 and the engaging portion 33 is a protrusive annular portion 32, and each of the connectors 30 is axially defined with a through hole 34 for passage of oil.

Figure 3:
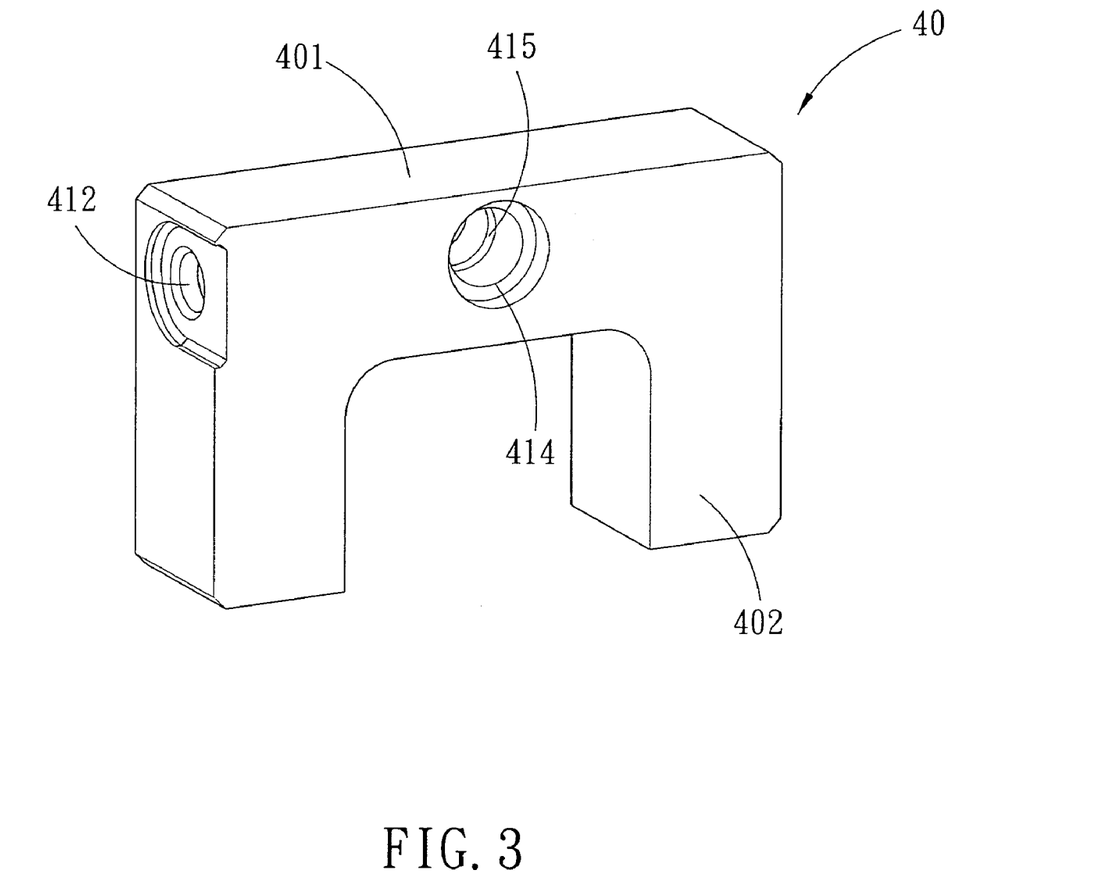
FIG. 3 is a perspective view of an oil tank in accordance with the present invention.
Figure 4:
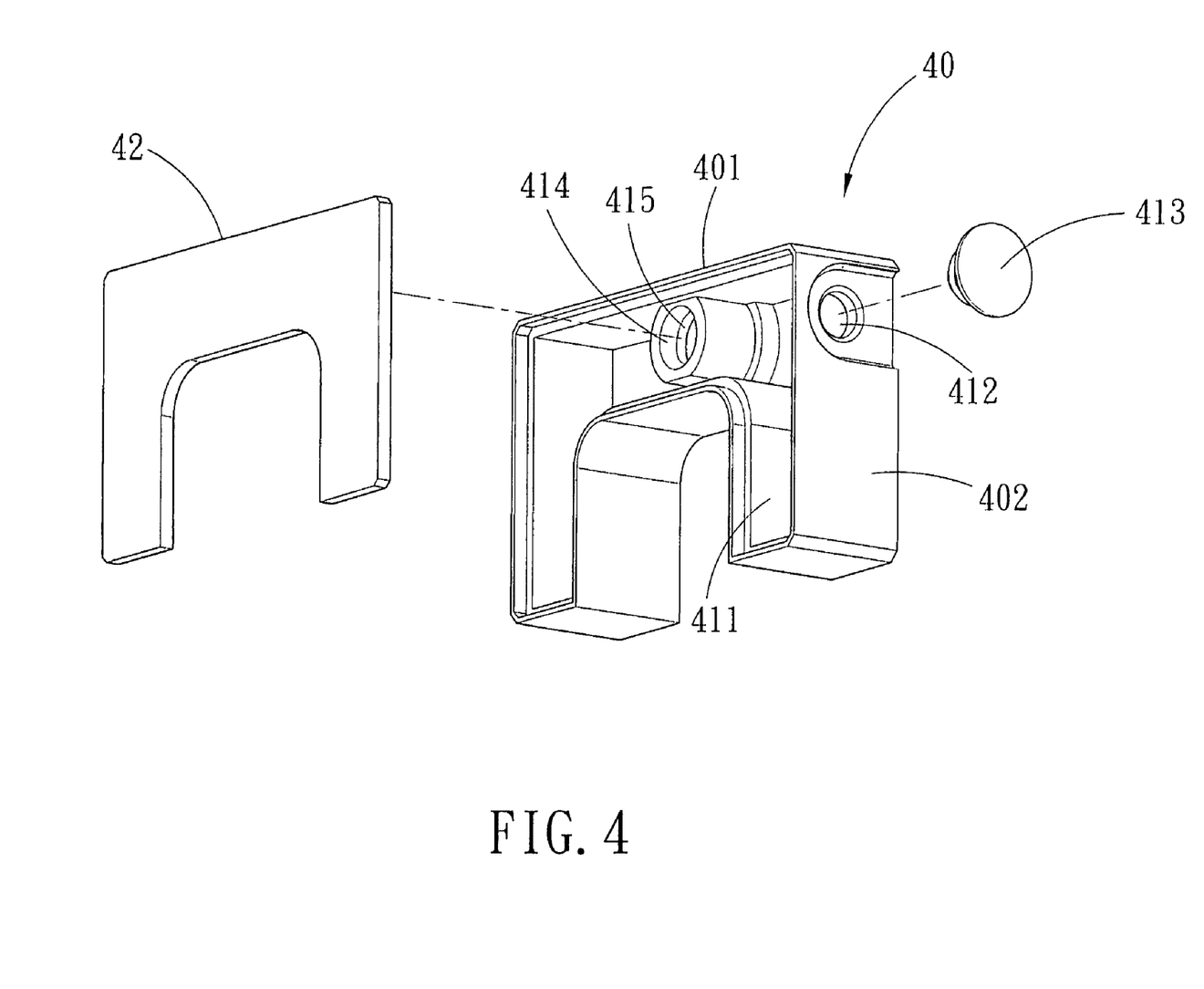
FIG. 4 is an exploded view of the oil tank in accordance with the present invention.
Figure 5:
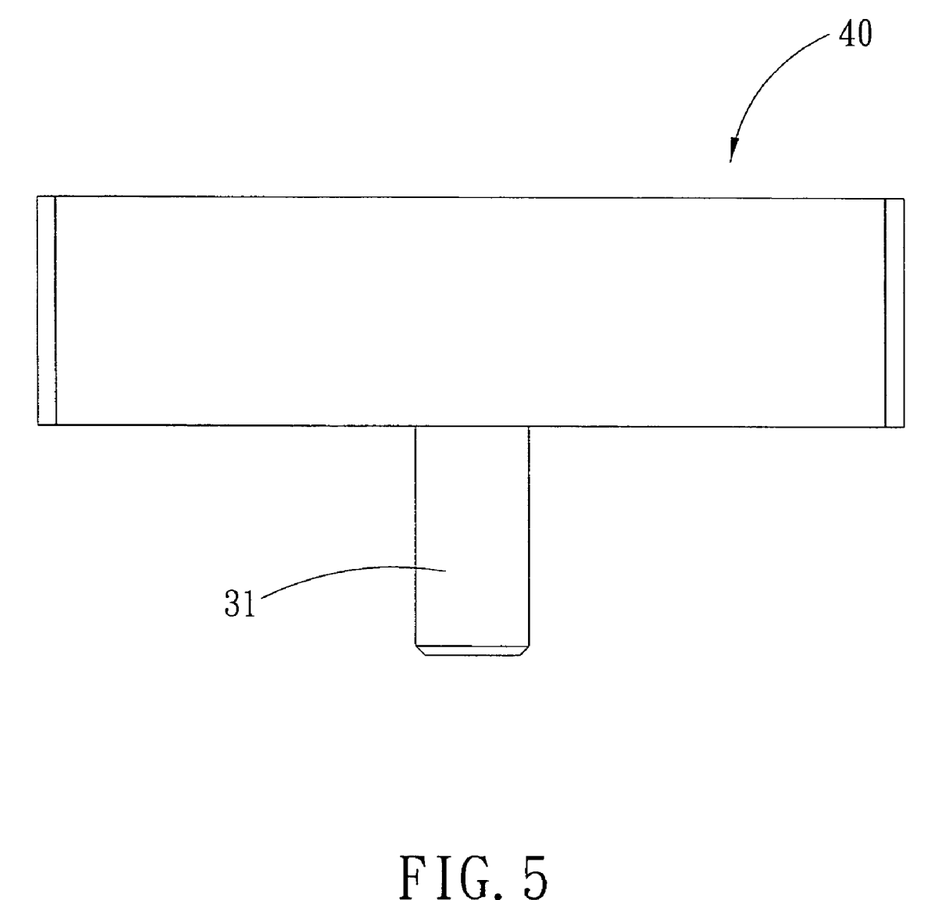
FIG. 5 is a side view of the oil tank in accordance with the present invention.
Figure 6:
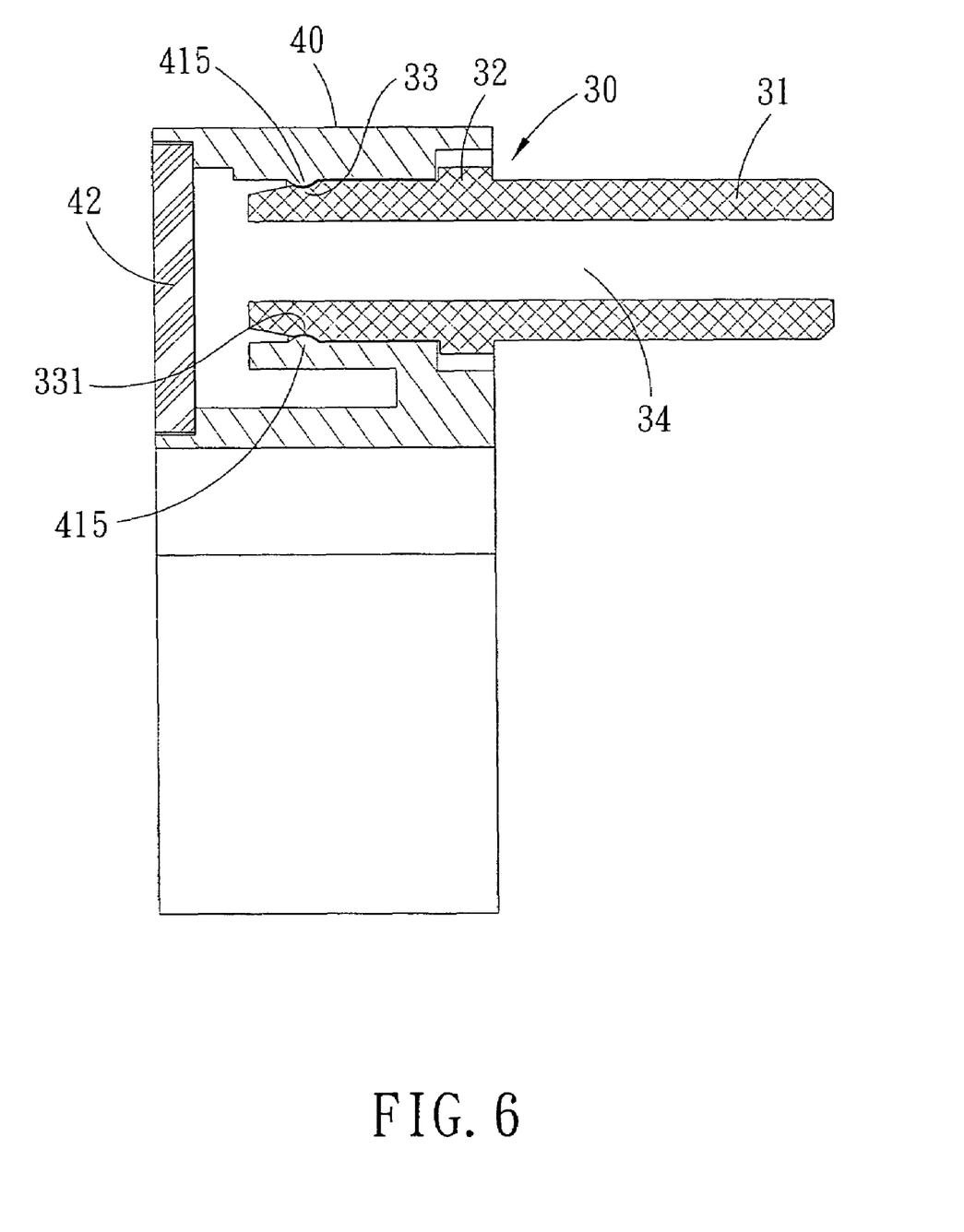
FIG. 6 is a cross sectional view of the oil tank in accordance with the present invention.
Figure 7:
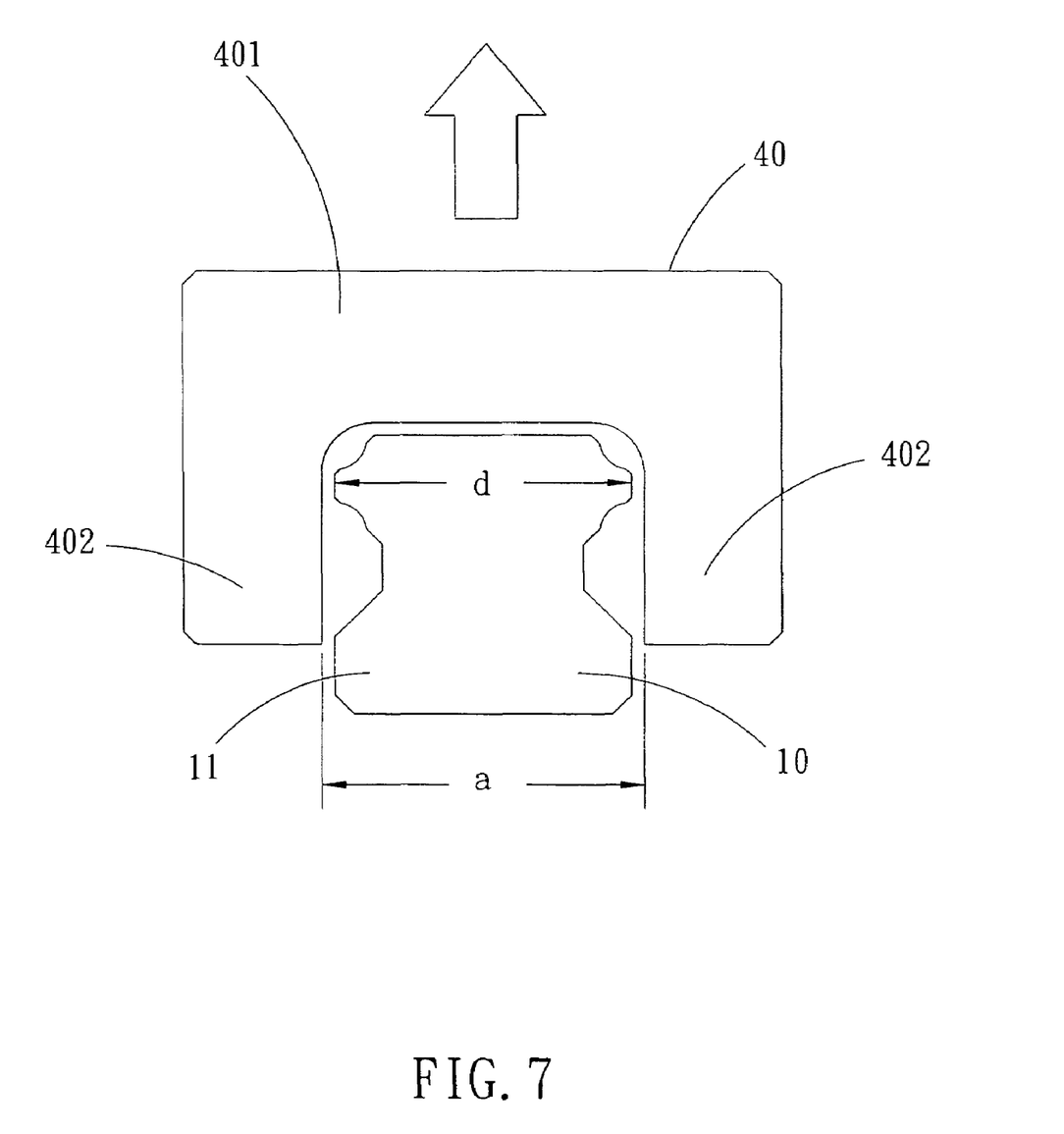
FIG. 7 shows the oil tank straddling on the rail.
Figure 8:
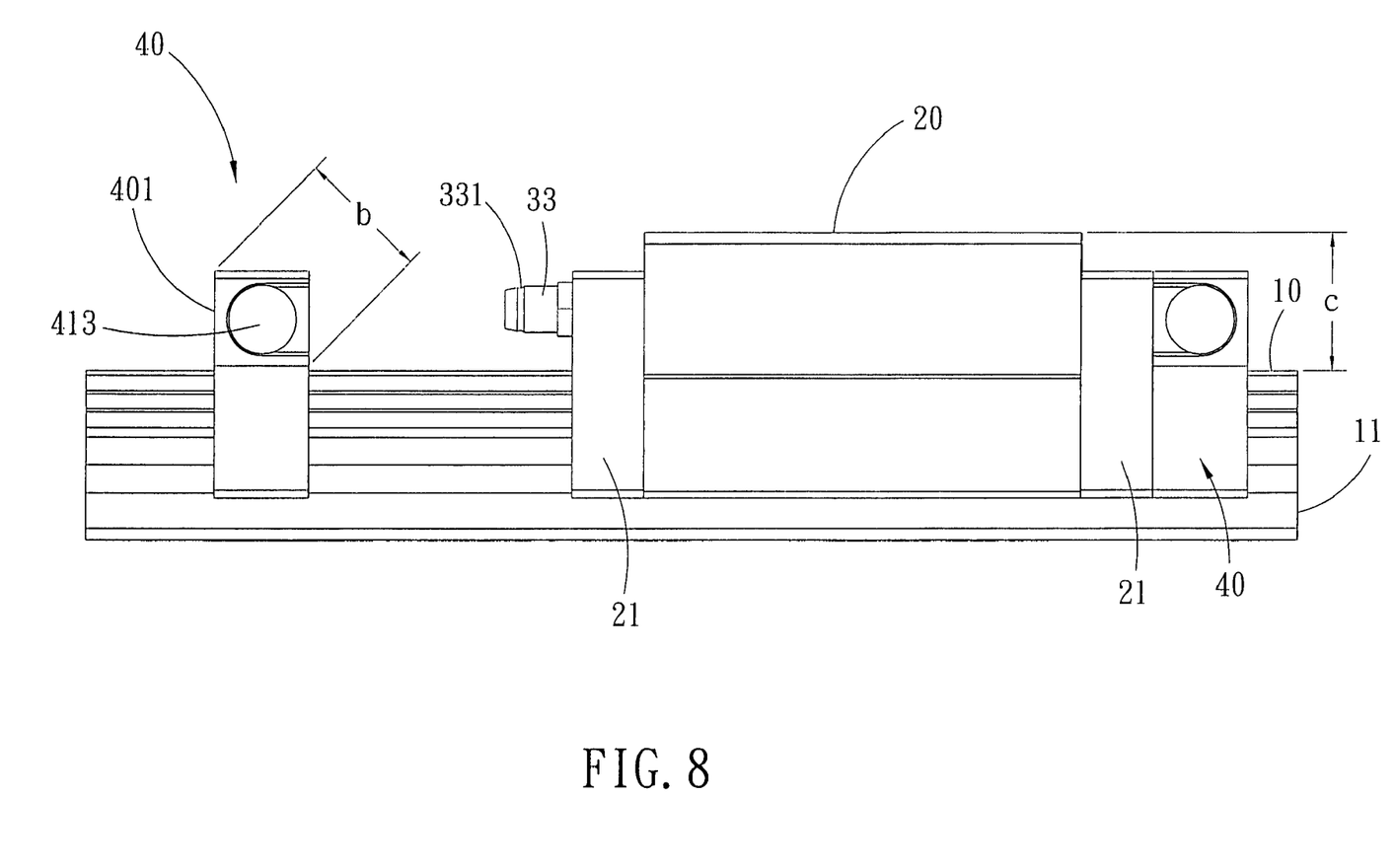
FIG. 8 is an operational view of the oil tank in accordance with the present invention.

The oil tanks 40 (as shown in FIGS. 7 and 8) each has a "Π"-shaped cross section and includes a base portion 401 and two extension portions 402. The distance a between the two extension portions 402 is larger than the maximum width d of the rail 10. The maximum width b of the base portion 401 of the oil tanks 40 is shorter than the distance c between the upper surface of the rail 10 and the top surface of the slide block 20. The oil tank 40, as shown in FIGS. 4, 5 and 6, includes a housing 41 and a cover 42 (the cover 42 is jointed with the housing 41 by supersonic wave, friction, heat-welding adhesive, epoxy adhesive or other methods). In the housing 41 are defined an oil recess 411, a feeding hole 412 that is sealed with an elastic rubber plug 413, and an oil outlet 414 for engaging with the engaging portion 33 of the connector 30. In the oil outlet 414 is defined an annular flange 415 for mating with the engaging groove 331 of the engaging portion 33. The oil tank as shown in FIGS. 1–3 is an integral unit formed by blow molding, so that the housing 41 is integral with the cover 42.

Figure 9:
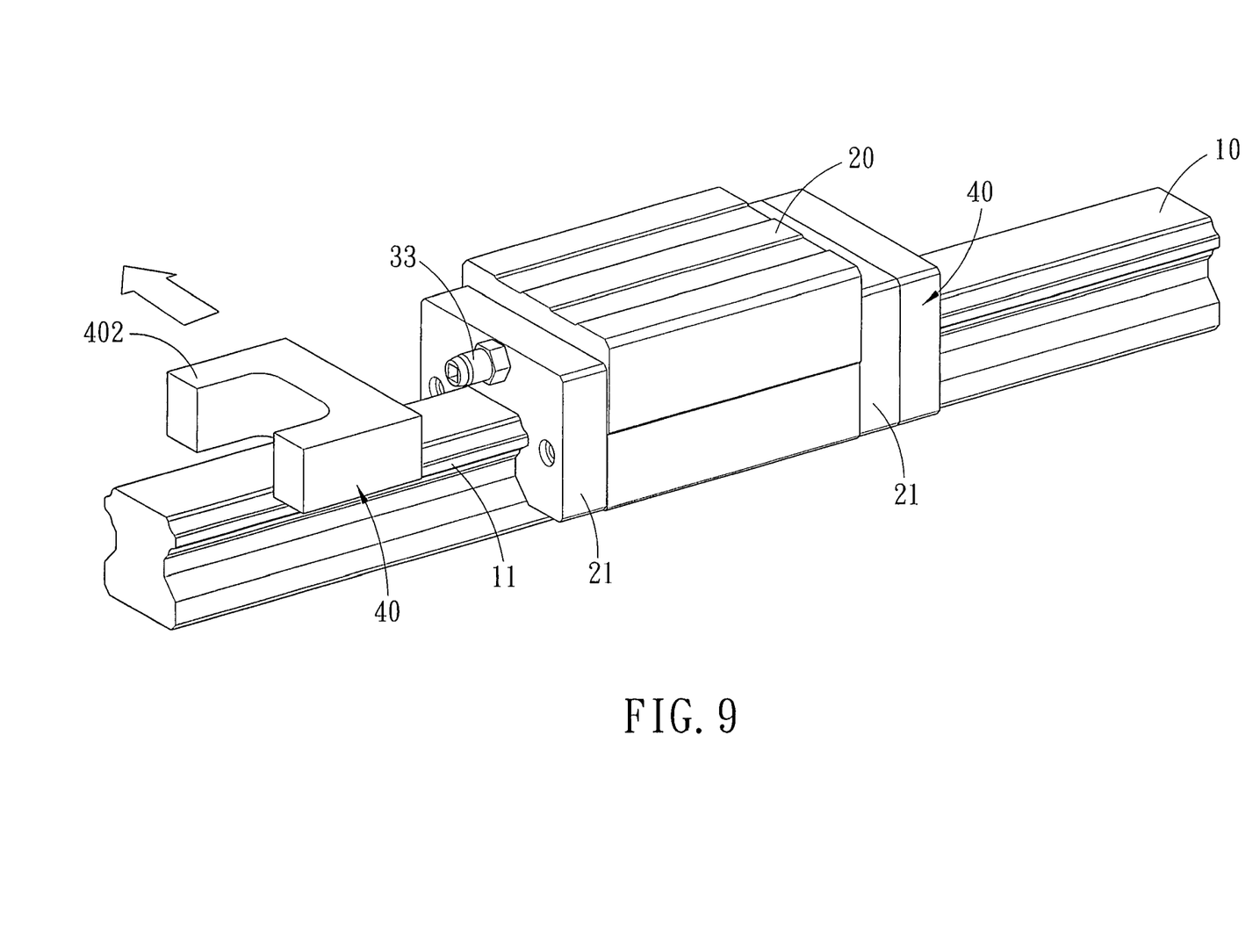
FIG. 9 is another operation view of the oil tank in accordance with the present invention.

For a better understanding of the present invention, its operation and function, reference should be made to FIG. 9. Since the oil tank 40 has a "Π"-shaped cross section formed by the base portion 401 and the two extension portions 402, and the distance a between the two extension portions 402 is larger than the maximum width d of the rail 10, the inner edge of the oil tank 40 accordingly does not contact the track 11 of the rail 10, and the two extension portions 402 of the oil tank 40 are allowed to be disengaged directly from the track 11 (as shown in FIG. 7). In addition, the maximum width b of the base portion 401 of the oil tanks 40 is shorter than the distance c between the upper surface of the rail 10 and the top surface of the slide block 20, this design allows the base portion 401 to rotate within the distance c, so that the oil tank 40 can be rotated to disengage from the track 11 of the rail 10 along the way as indicated by arrow. Therefore, the oil tank can be replaced independently and easily.

It will be noted that the connecting portion 31 of the connector 30 is screwed in the connecting hole 211 of the end cap 21, while the engaging portion 33 of the connector 30 mates with the oil outlet 414 of the oil tank 40 in such a manner that the engaging groove 331 of the engaging portion 33 is closely engaged with the annular flange 415 of the oil tank 40, obtaining a good sealing effect. Therefore, the oil tank 40 of the present invention can be assembled quickly without screws, and the wireless design allows the oil tank 40 to be replaced more easily in an ergonomic way.

While we have shown and described various embodiments in accordance with the present invention, it should be clear to those skilled in the art that further embodiments may be made without departing from the scope of the present invention.

What is claimed is:

1. A linear guideway with quick release oil tank comprising a rail, a slide block disposed on the rail and an oil tank disposed at an end of the slide block;
    wherein the oil tank is "II"-shaped in cross section and includes a base portion and two extension portions, a distance between the two extension portions is larger than a maximum width of the rail, and a maximum width of the base portion of the oil tanks is shorter than a distance between an upper surface of the rail and a top surface of the slide block.

2. The linear guideway with quick release oil tank as claimed in claim 1, wherein each of the oil tanks comprises a housing and a cover, in the housing are defined an oil recess and a feeding hole sealed with an elastic rubber plug.

3. The linear guideway with quick release oil tank as claimed in claim 1, wherein the oil tank is integrally formed by blow molding.

4. The linear guideway with quick release oil tank as claimed in claim 2 further comprising the rail, the slide block and connectors and the oil tanks, wherein an end cup is fixed at either end of the slide block, on the end cup is formed a connecting hole in communication with oil circuit inside the slide block and the end cup;
    each of the connectors is provided at either end thereof with a connecting portion and an engaging portion, and is further axially defined with a through hole for passage of oil; and
    the respective oil tanks are defined with an oil outlet for engaging with the engaging portion of the connectors.

5. The linear guideway with quick release oil tank as claimed in claim 3 further comprising the rail, the slide block and connectors and the oil tanks, wherein an end cup is fixed at either end of the slide block, on the end cup is formed a connecting hole in communication with oil circuit inside the slide block and the end cup;
    each of the connectors is provided at either end thereof with a connecting portion and an engaging portion, and is further axially defined with a through hole for passage of oil; and
    the respective oil tanks is defined with an oil outlet for engaging with the engaging portion of the connectors.

6. The linear guideway with quick release oil tank as claimed in claim 4, wherein the connecting hole of the slide block is interiorly formed with inner threads;
    the connecting portion at either end of the connectors is formed with inner threads for screwing with the connecting hole of the end cap, the engaging portion of each of the connectors is located opposite to the connecting portion and is provided on its outer surface with an engaging groove; and
    each of the oil tanks is provided with an annular flange to be engaged in the engaging groove of the connecting portion of the respective connectors, creating a sealing effect.

7. The linear guideway with quick release oil tank as claimed in claim 2, wherein the cover and the housing of the respective oil tanks are jointed together by ultrasonic wave, friction, heat-welding adhesive, epoxy adhesive.

* * * * *